Aug. 16, 1966
N. S. KAPANY
3,267,283
COLOR DISPLAY APPARATUS FOR IMAGES PRODUCED
IN DIFFERENT FREQUENCY RANGES
Filed June 4, 1964
2 Sheets-Sheet 1
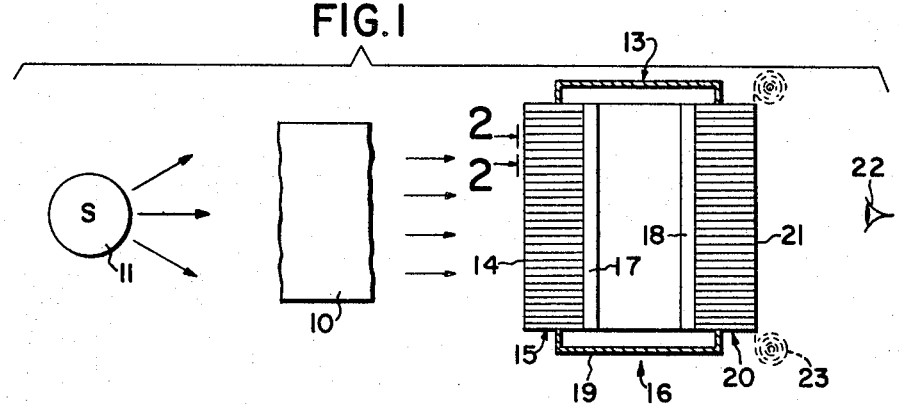
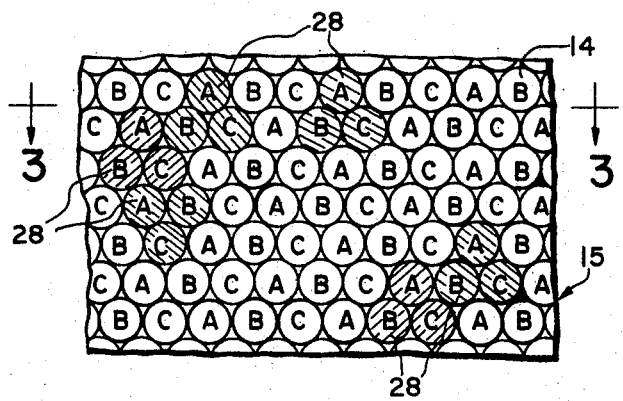
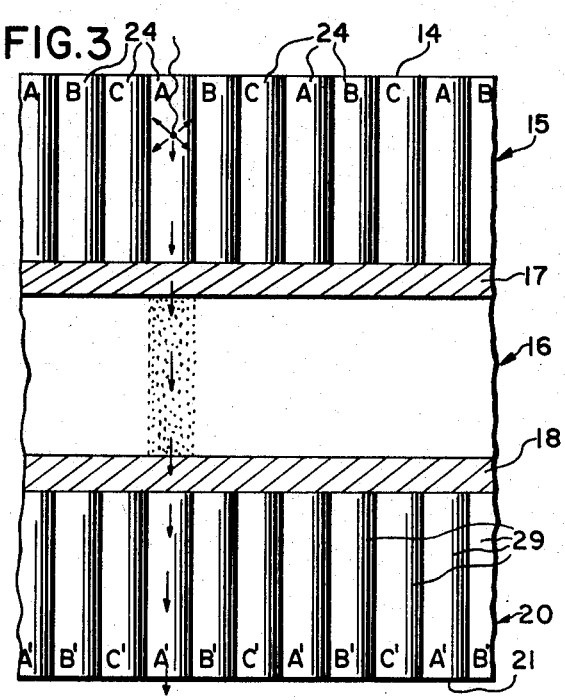
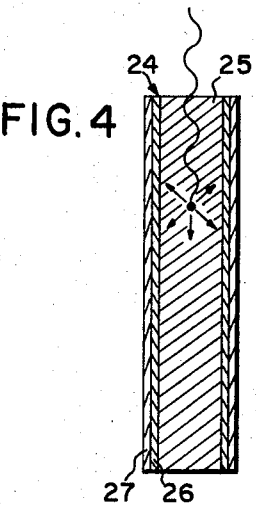
INVENTOR.
NARINDER S. KAPANY
BY
Townsend & Townsend
ATTORNEYS Aug. 16, 1966  N. S. KAPANY  3,267,283
COLOR DISPLAY APPARATUS FOR IMAGES PRODUCED
IN DIFFERENT FREQUENCY RANGES
Filed June 4, 1964  2 Sheets-Sheet 2

INVENTOR.
NARINDER S. KAPANY
BY
Townsend & Townsend
ATTORNEYS 3,267,283
COLOR DISPLAY APPARATUS FOR IMAGES PRODUCED IN DIFFERENT FREQUENCY RANGES
Narinder S. Kapany, Woodside, Calif., assignor to Optics Technology, Inc., Belmont, Calif., a corporation of California
Filed June 4, 1964, Ser. No. 372,589
10 Claims. (Cl. 250—71)

This invention relates to a method and apparatus for irradiating an object with radiation having components in various energy or frequency ranges, so that the object sensitivity to either reflection or transmission of radiation in the various ranges can be simultaneously or sequentially measured and observed in color.

By the observation of different reproductions of an object such as accomplished photographically using infrared and X-ray radiation either transmitted through or reflected from the object, characteristics of the object which are not apparent or visible under normal visual inspection can be observed. In the past devices have been employed utilizing radiation within only a single energy or frequency range or radiation within several ranges without provision for simultaneously observing the response of the object irradiated to the different ranges. However, many phenomena or substances have different appearances or characteristics in relation to the reflectance or transmission of radiation within different energy ranges such as, for example, the energy ranges generally designated, infrared, visible light, ultraviolet, far ultraviolet, soft X-rays, X-rays, hard X-rays, and other high energy particles. Thus, the appearance of an object viewed under infrared radiation differs from the appearance of the same object viewed under ultraviolet radiation. Similarly, the X-ray plates taken when an object is subjected to X-rays of different energies such as, for example, 30 kev. and 60 kev. disclose a difference in the transmission by the object of the different energies.

One of the principal objects of this invention is to provide a device for viewing an object irradiated with radiant energy having components at various energy levels or within various energy ranges and including closely associated transducers which are selectively responsive to different relatively narrow energy pass bands and which are adapted to receive either the reflected or transmitted radiation from the object so that each of the transducers will provide an output which is a function of the amount of energy either reflected from or transmitted through the object in the energy range to which it is sensitive.

An advantage of this invention lies in the fact that the relative selectively of radiation transmission or reflectance within the different energy ranges by the object viewed is immediately observable through the utilization of this invention.

Another object of this invention is to provide a visual display for the output of the transducers by which each transducer which is responsive to a selected energy pass band is arranged to produce a light output of a selected visible color, whereby the radiation response by the object to different energy levels or ranges can be viewed simultaneously and is then immediately discernible in terms of a color differential of the display created.

Another object of this invention is to provide a transducer made up of minute areas each of which includes a cluster of transducers, each of which, in turn, is sensitive to a different radiant energy range, whereby a multitude of such minute areas produces a colored imagery which is closely analogous in form and shape to the object viewed, but in which the color display conveys information related to shape and form correlated to the response by the viewed object to energies in the different energy ranges.

One of the advantages of this invention lies in the fact that the reaction by the object or patient to each radiation range is readily observed by the reproduction in an appropriate color and the comparative reaction by the object or patient to the different energy ranges is vividly displayed by the several different appropriate colors. By virtue of these features, characteristics, phenomena and conditions of objects are discernible which are more difficult to detect under either monochromatic or broadband conditions.

As a further object of the invention, the transducer employed includes an array of first stage transducer fiber clusters each cluster having a matrix of fibers. The various fibers within each cluster are formed of or provided with materials of different compositions. These different compositions determine the frequency or energy range to which the fiber is responsive either to transmit radiant energy within the particular energy range or to become active when excited by radiant energy within the particular energy or frequency range. Energy output from the fibers is then passed through second stage transducers of selected color characteristics, so that all the first stage transducer fibers responsive to a particular energy range produce light in the second stage transducers having a particular color and all the first stage transducer fibers responsive to a different energy range produce light through second stage transducers having a different color thereby to provide a color display in which the colors are correlated with different radiant energy ranges for which the absorption, transmission or reflection by the object may vary.

As a further object of the invention, the first stage transducer is made up of a multitude of scintillating elements, preferably in fiber form, and constructed so as to produce output energy when subjected to energy within a particular range.

An advantage of the use of high quantum efficiency scintillating elements or fibers lies in the fact that such elements are highly efficient converters of incident energy and therefore the amount of radiation to which the object or patient being examined is subjected is reduced to a minimum. For example, in conventional fluoroscopic examination in medical diagnostics the fluoroscopic screen has an inherently low absorptivity so that the patient is exposed to dangerously high radiation exposures. Additionally, scintillating fibers provide a high photometric efficiency because of internal reflections.

Another object of the invention is the provision of scintillating fibers of selected compositions so that the fibers of each composition produce scintillation only when subjected to a particular desired range of energies.

Still another object of this invention is the provision of different filter coatings on the ends of different scintillating fibers such that each of the fibers produces an output energy signal only when subjected to radiation within a particular energy range associated with the particular filter coating.

It is also within the province of this invention to provide image intensification or photomultiplication of the light output from the first stage transducer by employing a fiber matrix input into an image intensifier in which a photocathode projects light onto an anode either alone or in tandem with other image intensifiers to obtain the requisite light intensity required for adequate viewing.

In accordance with still another aspect of the present invention, the output of the image intensifier is constructed of matrices of second stage transducers, each matrix having a plurality of transducers, each of which is associated with a first stage transducer and has a selected color characteristic for producing a particular color when energized by a particular transducer portion at the input of the image intensifier.

In accomplishment of the last aforementioned object of this invention, the transducers at the output of the image intensifier can be colored optical fibers, visible light-transmitting fibers provided with filter means either at the input or output ends thereof, or optical fibers the input ends of which are coated with differently colored phosphors which make up the photoanode of the image intensifier as well as produce the appropriately colored output light for the color display.

A still further object of this invention is the provision of a viewing assembly for viewing an object irradiated with energy in different energy ranges including a first stage transducer coupled to the photocathode of an image intensifier for activating portions of the photocathode in response to radiation of different energy ranges directed onto the transducer input and a second stage transducer spaced from the photocathode and made up of a multitude of cathodoluminescent optical fibers provided with color means for producing colored output light from different cathodoluminescent fibers in response to emission from different associated portions of the photocathode.

One feature of a viewing device constructed in accordance with the next preceding object lies in the fact that image intensification takes place in the viewing device and the necessity for a photoanode in the image intensifying portion of the viewing device is avoided.

Still another object of the present invention is the provision of a viewing assembly for an object irradiated with energy within different energy ranges including a plurality of transducers arranged to produce selected visible light output, a video pickup assembly for detecting the visible light output from the transducers and a video color display means for displaying a colored image of the visible light output image, the different colors of the image being associated with the response by the object to the different energy ranges.

Still another object of the present invention is the provision of a method for producing a colored image of the response by an object to energy within selected energy ranges which comprises the steps of irradiating the object with energy within selected energy ranges, detecting the response of the object to irradiation within the different energy ranges and producing a colored image of the detected response with each of the colors of the image produced being correlated to one of the selected energy ranges with which the object is irradiated.

Other objects of the present invention will become apparent upon reading the following specification and referring to the accompanying drawings in which similar characters of reference represent corresponding parts in each of the several views.

In the drawings:

FIG. 1 is a schematic side elevational view partially in cross-section of apparatus in accordance with the present invention;

FIG. 2 is an enlarged view of a portion of the structure shown in FIG. 1 taken along line 2—2 looking in the direction of the arrows;

FIG. 3 is an enlarged view of a portion of the structure of FIG. 2 taken along line 3—3 looking in the direction of the arrows;

FIG. 4 is an enlarged schematic view of one of the fibers illustrated in FIG. 3;

Figure 6:
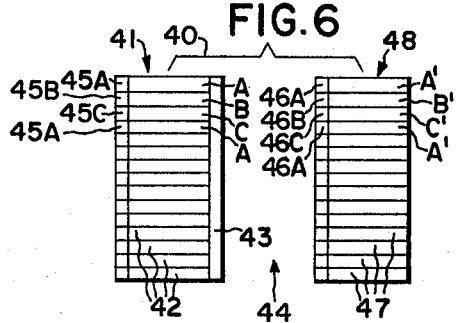
Figure 7:
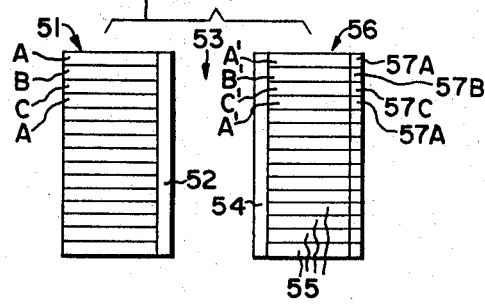
Figure 8:
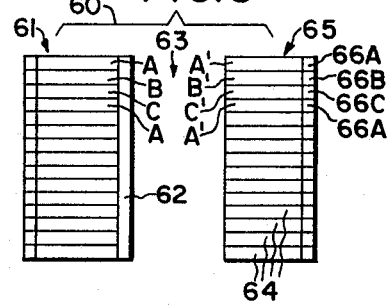
Figure 9:
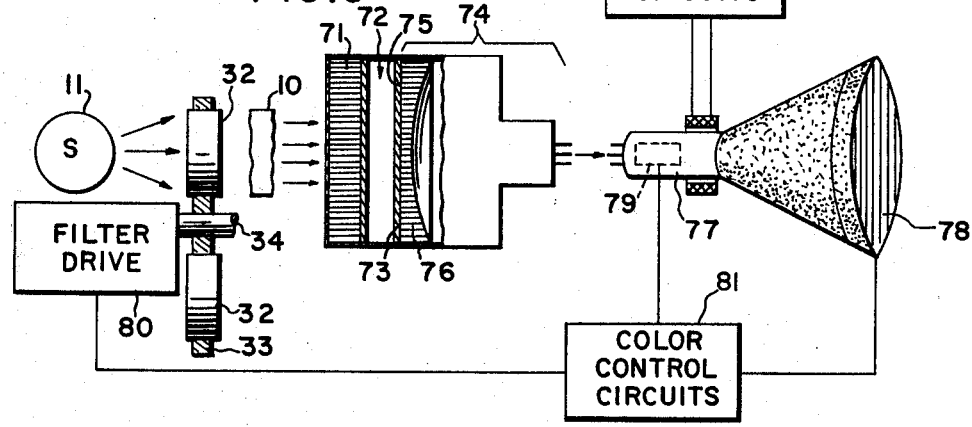

FIGS. 6–8 inclusive are views similar to FIG. 3 showing other embodiments of the present invention; and FIG. 9 is a view similar to FIG. 1 showing still another embodiment of the present invention.

For sake of convenience, the invention will be described below first with respect to color translating radiography for producing a color display of the transmission by an object of X-rays having energies such as, for example, 30, 50 and 70 kev. It is to be understood, however, that the invention is applicable for the comparison of many different energy ranges which may lie within or encompass such ranges as infrared, visible light, ultraviolet, far ultraviolet, soft X-rays, X-rays, hard X-rays, and other high energy particles.

Referring now to FIG. 1, an object absorbing specimen or patient 10 is irradiated from a source 11 with X-ray energy at several different levels such as, for example, 30, 50 and 70 kev. The source 11 can be any of the conventional X-ray sources such as a bombarded tungsten target that will produce X-rays at the three different levels mentioned above. While the source 11 is shown for purposes of illustration as a single element which produces X-rays at the three different levels, it may constitute a single source, multiple sources, modulated source or equivalent structure for producing radiation in the several different desired energy ranges.

The radiation from the source 11 is directed through the object 10 and selectively absorbed by the properties of the object 10. When utilizing radiation in other levels, the radiation may be reflected from the object rather than transmitted through it.

The radiation transmitted through or reflected from the object is directed onto a viewing and display apparatus 13 which has a front or input face 14 for an input or first stage transducer 15 which produces output signals that are a function of the frequency or energy range of energy either reflected from or transmitted through the object. The output signals are applied to a diode type, electrostatically focused, image intensifier 16 which includes a photocathode 17 such as a cesium antimonide photosurface and a closely spaced anode or phosphor 18 with a vacuum maintained therebetween by a vacuum envelope 19. A proper voltage such as, for example, 15–30 kv. is maintained between the photocathode 17 and anode 18, and under certain special conditions these elements of the image intensifier can also be immersed in a magnetic field.

Located adjacent the phosphor 18 of the image intensifier 16 is an output or second stage transducer 20 which is provided with an output face or display panel 21 for displaying in different colors the image produced with radiation of the different energies. The display panel may either be visually viewed at 22 or recorded on a film schematically illustrated as 23.

Naturally the image intensifier 16 can have any number of stages with optical fiber intermediate stages to produce the desired amount of image intensification and other types of image intensifiers such as, for example, channeled image tubes or solid state devices can be utilized.

Referring now to FIGS. 2–4, the input or first stage transducer 15 is made up of a multitude of transducer elements in the form of scintillating fibers 24 which produce output energy when subjected to energy within a particular range. The scintillating fibers 24 are made of glass or glass-like material, the composition of which is preferably selected to produce energy in the form of photons when subjected to radiation such as the X-rays having a particular energy or lying within a particular energy range in the present illustrative example. Naturally, the composition of the scintillating fibers depends upon the particular radiation energy range for which it is desired to scintillate. The scintillating material of the scintillating fibers 24 may be plastic, liquid, glass or other substances. By way of example, a good liquid scintillator that can be contained in a hollow cylinder is a solution containing 5 g./liter p-terphenyl and 0/5 g./liter of POPOP dissolved in p-xylene. Glass or glass-like scintillating materials are cerium oxide glasses, crystalline zinc sulphide, and crystalline platinum cyanide. Other types of "doped" glasses can be used.

A typical glass scintillating fiber 24 is illustrated in FIG. 4 and includes a central cylindrical portion of scintillating material 25, a surrounding coating 26 of glass having an index of refraction lower than the index of refraction of the scintillating material 25 for producing multiple internal reflections within the material 25, and a layer of absorbing material 27 to prevent cross-talk that would otherwise be caused by the passage of light from one fiber to the next. In the case of X-ray radiation, the layer of absorbing material 27 is preferably a high density glass such as, for example, lead for preventing X-ray cross-talk between adjacent fibers.

The fibers sensitive to different energy ranges such as the energy levels mentioned above are designated, for purposes of illustration, fibers A, B and C. Closely packed matrices or clusters 28 of fibers are assembled and processed to form a rigid bundle or fused plate of fibers with the mechanical properties of a single vacuum-tight block of glass but which nevertheless has all the intrinsic optical properties of the individual fibers of which it is composed. This fused plate of scintillating fibers 24 can be constructed by methods similar to the conventional methods for fabricating fused optical fiber plates and serves as the entrance window for the image intensifier 16. Each of the matrices 28 includes one of the A fibers, one of the B fibers and one of the C fibers so that the input face 14 of the transducer 15 is made up of a multitude of minute matrices, each of which is provided with scintillating fibers to produce separate output signals corresponding to the radiation energy incident on that matrix to which each of the several fibers within the matrix is sensitive.

It will be appreciated that the input face 14 of the transducer 15 can readily produce an imagery which is analogous in form to the response by the object 10 to the different energy ranges since the scintillating fibers 25 are normally of the nature of approximately 3–7 microns in diameter, the input face 14 of the first stage transducer 15 being typically on the order of 10″ in diameter.

While direct scintillation is proposed for the preferred method and apparatus of this invention in the first stage transducer for converting energy in certain ranges to visible light, other techniques such as electron positron formation, solid state amplification, ionization and photoelectron emission followed by electroluminescence can be utilized.

The output or second stage transducer 20 is formed as a fused plate of optical fibers 29 formed in a manner similar to the formation of the input transducer described above. However, the optical fibers 29 in the output transducer 20 are colored glass fibers adapted to be illuminated by the phosphor 18. The colored fibers 29 are arranged in matrices or clusters 30 which are aligned with the matrices 28 of the input transducer 15, and include fibers A', B' and C' substantially optically aligned with the fibers A, B and C in the matrices 28 of the input transducer 15. The fibers A', B' and C' are selected to transmit different colors such as red, green, and blue respectively so that the production of photons in one of the scintillating fibers A, B and C in a matrix 28 in response to irradiation within a given energy range results in an output colored light from the associated fiber A', B' or C' of the matrix 30 after introduction of light into the colored fiber 29 from the image intensifier 16.

As is apparent from the above, the image displayed on the output face 21 of the output transducer 20 is a colored image with the different colors representing the object transmission or reflector of the respective different radiation energies.

Figure 5:
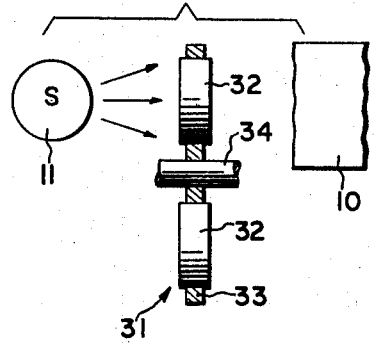
FIG. 5 is a schematic side elevational view partially in cross-section of an alternative structure for a portion of the structure shown in FIG. 1.

Referring now to FIG. 5, there is shown a schematic side elevational view of a filter mechanism 31 for consecutively irradiating the object 10 with energies within particular desired energy ranges. The filter mechanism 31 includes a plurality of filters 32, each adapted to pass energy within a different desired energy range and mounted on a rotatable disc 33 rotated by means of an axle 34. As the axle 34 rotates, the different filters 32 pass between the source 11 and the object 10 to pass radiation within different energy ranges from the source 11 to the object 10.

Referring now to FIG. 6, there is illustrated a schematic side elevational view of an alternative viewing and display assembly 41 which is provided with an input or first stage transducer 42 composed of a multitude of transducer elements such as scintillating fibers which produce an output signal for application to a photocathode 43 of an image intensifier 44. Instead of selecting the composition of the scintillating fibers 42 for the production of an output signal in response to energy within a particular energy range as described above with respect to FIGS. 1–4, the input ends of the scintillating fibers 42 are provided with filter coatings 45 such as, for example, thin metallic coatings which serve to pass into the scintillating fibers 42 energy within a particular energy range. Different filter coatings $45_A$, $45_B$ and $45_C$ are applied to the different fibers A, B and C in each matrix or cluster of fibers 42, and photons are created within the different scintillating fibers A, B and C in each matrix only when energy is passed through the associated filter coating $45_A$, $45_B$ and $45_C$ respectively.

In the embodiment illustrated in FIG. 6 the anode of the image intensifier 44 takes the form of colored phosphorous coatings 46 on the input ends of light-transmitting optical fibers 47 in the output transducer 48. The colors of the phosphor coatings $46_A$, $46_B$ and $46_C$ on fibers 47 are selected to produce the same colored output light in every one of the respective fibers A', B' and C' associated with scintillating fibers A, B and C which are responsive to radiation within the particular energy ranges. With these phosphor coatings, it is possible to utilize in the output transducer 48 standard optical fibers which transmit visible light and are less expensive than colored optical fibers. This construction would be analogous to a fiber optics color TV screen for the output transducer.

Referring now to FIG. 7, there is illustrated a schematic view of still another embodiment of the present invention wherein the viewing assembly 50 includes an input transducer 51 of range responsive scintillating fibers such as shown in FIG. 3 or range filter coated scintillating fibers such as shown in FIG. 6, the output from the fibers being applied to the photocathode 52 of an image intensifier 53. Electrons produced at the photocathode 52 are directed onto the anode or phosphor 54 of the image intensifier to produce output light signals in optical fibers 55 of an output transducer 56. The optical fibers 55 are of a conventional variety which transmit visible light and the output ends of the respective optical fibers 55 are provided with color filters $57_A$, $57_B$ and $57_C$ to produce the desired color display for illustrating the absorption or reflection of the different energy ranges to which the several viewing trains A, B and C within the viewing apparatus 50 are responsive.

Referring now to FIG. 8, there is illustrated a schematic view of still another embodiment of the present invention wherein the viewing assembly 60 includes an input transducer 61 such as, for example, the input transducer 41 described with reference to FIG. 6. The photons created in the input transducer 61 are directed onto the photocathode 62 of an image intensifier 63. Electrons from the photocathode 62 are passed directly to the optical fibers 64 in the output transducer 65 without the intermediary of a phosphor coating. These optical fibers 64 in the output transducer are made of a cathodoluminescent material such as, for example, doped silica which will produce light when subjected to electrons from the image intensifier 63. These optical fibers 64 can be selected to fluoresce in different colors, or as illustrated, the fibers 64 corresponding to the different energy range responsive trains A, B and C can be coated with color filters $66_A$, $66_B$ and $66_C$ of the desired colors for the different trains.

Referring now to FIG. 9, there is a schematic view of a radiation and viewing assembly provide with a video display assembly in the viewing apparatus. As illustrated, the means for generating energies within several different ranges includes a rotating filter mechanism such as that described with reference to FIG. 5 and in which there are three different filters which permit irradiation of the object 10 with energy in three different energy ranges. The viewing apparatus includes an input transducer 71 composed of scintillating fibers sensitive to all of the different energy ranges or any of the other types of input transducers described above, the output from the fibers being applied to an image intensifier 72. A video image pickup tube 74 is provided in the viewing assembly and has a front surface 75 made up of fused optical fibers 76 which are optically aligned with corresponding fibers of the input transducer 71. The front surface 75 of the tube 74 is positioned in registration with the phosphor anode 73 of the image intensifier 72 for detecting the image displayed on the phosphor 73 in response to the energy picked up in the input transducer 71. The picture from the pickup tube 74 is transmitted to a color television tube 77 via appropriate circuitry (not shown). The color tube 77 includes a gun 79 and is provided with conventional deflection circuits 82 and color control circuits 81. A color television presentation on the screen 78 of the tube 77 is made by synchronizing the color control circuits 81 for the color tube 77 with the filter drive 80 for the filter mechanism 31 so that each color in the television presentation represents the radiation response by the object to energy in only one energy range. In this manner, the color imagery on the output screen 78 of the color tube 77 is a result of spectral differences in the radiation transmitted through the specimen. Obviously, other techniques using a modulated source or a rotating three-target source can be utilized for irradiating the specimen 10 and the appropriate circuit connections made with the color picture tube for producing specific output colors in response to the radiation transmitted through the specimen within particular ranges. Also, other arrangements for producing the video color display can be utilized and such arrangements are within the purview of those skilled in the television art.

While the invention has been described specifically with respect to optical or scintillating fibers the invention can be practiced with optical or scintillating elements other than in fiber form. However, fibers have an inherent high photometric efficiency as light gathering devices and can be up to 40 times as effective as the best available lens. Additionally, fibers are easily fused into rigid vacuum tight plates which can serve as windows for vacuum chambers such as required in the diode type image intensifiers described above.

While the invention has been described by way of example with respect to comparison of the absorption by an object of X-rays of different energies, a comparison can be made for any combination of energy ranges such as, for example, infrared, visible and ultraviolet or visible and X-ray, etc.

Although the foregoing invention has been described in some detail by way of illustration and example for purposes of clarity of understanding, it is understood that certain changes and modifications may be practiced within the spirit of the invention as limited only by the scope of the appened claims.

It is claimed:

1. A device for viewing an object comprising means for generating and directing radiation in an energy spectrum having energy components within at least two different frequency ranges onto an object, the frequency range of at least one of said energy components being outside the visible light frequency range viewing means adapted for viewing the energy received from said object, said viewing means having at least two viewing trains, each of said viewing trains operable to create visible light when excited by energy within only one of the frequency ranges, and means provided along each of said viewing trains for coloring the visible light created in said viewing train, each coloring means producing a colored light with a color different from the color of the colored light produced in the other coloring means in other viewing trains.

2. A device for viewing an object comprising means for irradiating said object with an energy spectrum having components at a plurality of frequencies, a plurality of fibers means arranged to receive the radiant energy from said object, said fiber means arranged in a plurality of clusters of fibers, each cluster of fibers having first fibers sensitive to energy of a first frequency and second fibers sensitive to energy of a second frequency, the frequency sensitivity of at least one of said first and second fibers being outside the frequency spectrum of the visible light energy range, means to provide visible light output from said fibers when said fibers are irradiated by energy of frequency to which they are sensitive, and means to render the light output from said first fibers in a first color spectrum visually distinguishable from the color of the light output from said second fibers.

3. Apparatus for viewing an object comprising means for generating and directing onto an object radiation having energy components within at least two different frequency ranges and at least two distinct viewing trains, the frequency range of at least one of said radiation energy components being outside the visible light frequency range, each of said viewing trains including a first stage transducer for producing a substantial output energy signal in response to radiant energy within only one of said frequency ranges which is distinct from the frequency range of other first stage transducers, a second stage transducer for producing a visible light output in response to the output signal from the associated first stage transducer, and color means associated with said second stage transducer for rendering the colored light output from said train visually distinguishable from the colored light output of the second stage transducers of the other train.

4. Apparatus for viewing an object that is to be irradiated with energy components within at least two different energy ranges including a plurality of scintillating fiber means arranged to receive the radiant energy from the object, said scintillating fiber means arranged in a plurality of clusters of fibers with each cluster of fibers having first fibers sensitive to energy in one of said energy ranges and second fibers sensitive to energy in another of said energy ranges, means for providing visible light output from said fibers when said fibers are irradiated by energy within the energy range to which they are sensitive, and means responsive to the light output from said scintillating fibers to produce a colored light spectrum, the color spectrum responsive to the light output from said first scintillating fibers distinguishable from the color spectrum responsive to the light output from said second scintillating fibers.

5. Apparatus for viewing an object to be irradiated with energy components within at least two different energy ranges and with at least one of said energy ranges being outside the visible light energy range including a transducer for detecting the energy received from said object and producing light output that varies in accordance with the intensity and energy range of such received energy, said transducer including at least a plurality of first scintillating fibers for producing and transmitting output light in accordance with the received energy from said object and within one of said energy ranges and a plurality of second scintillating fibers closely packed with and dispersed among said first scintillating fibers for producing and transmitting output light in accordance with the received energy from said object and within another of said energy ranges; means for intensifying the light output from said transducer and an optical fiber display screen made up of at least a plurality of first optical fibers for transmitting output light from said first scintillating fibers and a plurality of second optical fibers for transmitting output light from said second scintillating fibers, and color means associated with said first and second optical fibers to produce a light output from said first optical fibers in one color and a light output from said second optical fibers in another color.

6. A device for viewing an object that is to be irradiated with energy components within at least two different energy ranges and with at least one of said energy ranges being outside the visible light energy range comprising means for detecting the energy received from said object, and means for substantially simultaneously producing visible light displays of the energy received from said object for said different energy components, the intensity of the light in each of said displays varying across the display in accordance with the intensity of received energy of the particular energy component across the object, said display means including an optical fiber diplay screen made up of closely packed optical fibers and having at least a plurality of first optical fibers for transmitting light in accordance with the received energy from said object and within one of said energy ranges, a plurality of second optical fibers for transmitting light in accordance with the received energy from said object and within another of said energy ranges, and color producing means for producing a light output from said first optical fibers in one color and a light output from said second optical fibers in another color.

7. The device according to claim 6 characterized further in that said first optical fibers are of a first colored material and said second optical fibers are of a second colored material.

8. The device according to claim 6 characterized further in that said first optical fibers include filter means for passing light of one color and said second optical fibers include filter means for passing light of another color.

9. The device according to claim 6 characterized further in that said optical fibers are of cathodoluminescent material.

10. A device for viewing an object that is to be irradiated with energy components within at least two different energy ranges and with at least one of said energy ranges being outside the visible light energy range comprising means for detecting the energy received from said object and for producing light output that varies in accordance with the intensity and energy range of such received energy, a photocathode positioned to receive said light output from said energy detecting and light producing means, an anode spaced from said photocathode, said anode and photocathode arranged to produce an electron discharge in response to the output from said energy detecting and light producing means, and means for displaying, in color, images produced on said anode by the energy received from the object for the different energy ranges, said displaying means including an optical fiber display screen made up of closely packed optical fibers and having at least a plurality of first optical fibers for transmitting light in accordance with the received energy from said object and within one of said energy ranges and a plurality of second optical fibers for transmitting light in accordance with the received energy from said object and within another of said energy ranges and color means associated with said first and second optical fibers to produce a light output from said first optical fibers in one color and a light output from said second optical fibers in another color.

References Cited by the Examiner
UNITED STATES PATENTS 2,764,149 9/1956 Sheldon _____ 176—6 X
2,877,368 3/1959 Sheldon _____ 250—227 X RALPH G. NILSON, *Primary Examiner.*

JAMES W. LAWRENCE, *Examiner.*